United States Patent
Giordano, Jr. et al.

(10) Patent No.: US 11,959,510 B1
(45) Date of Patent: Apr. 16, 2024

(54) METHOD FOR MANUFACTURING A STANDARDIZED OUTER HOLSTER SYSTEM WITH FIREARM SPECIFIC INNER HOLSTER INSERTS

(71) Applicant: Blade-Tech Industries, Inc., Streetsboro, OH (US)

(72) Inventors: Anthony S. Giordano, Jr., Streetsboro, OH (US); Tyler J. Johnson, Oberlin, OH (US); Jarett M. Peterson, Alliance, OH (US)

(73) Assignee: BLADE-TECH INDUSTRIES, INC., Streetsboro, OH (US)

( * ) Notice: Subject to any disclaimer, the term of this patent is extended or adjusted under 35 U.S.C. 154(b) by 0 days.

(21) Appl. No.: 18/453,583

(22) Filed: Aug. 22, 2023

(51) Int. Cl.
| | |
|---|---|
| B29C 45/16 | (2006.01) |
| F16B 7/00 | (2006.01) |
| F41C 33/02 | (2006.01) |
| B29C 45/00 | (2006.01) |

(52) U.S. Cl.
CPC ............ *F16B 7/00* (2013.01); *B29C 45/1671* (2013.01); *F41C 33/0209* (2013.01); *B29C 45/0062* (2013.01); *B29C 2945/7629* (2013.01); *F41C 33/02* (2013.01); *F41C 33/0254* (2013.01); *Y10T 29/49893* (2015.01); *Y10T 29/49904* (2015.01); *Y10T 29/4998* (2015.01)

(58) Field of Classification Search
CPC .. F41C 33/0209; F41C 33/0254; F41C 33/02; Y10T 29/49904; Y10T 29/4998; Y10T 29/49893; B29C 45/0062; B29C 45/1671; B29C 2945/7629
See application file for complete search history.

(56) References Cited

U.S. PATENT DOCUMENTS

| | | |
|---|---|---|
| 5,570,830 A | 11/1996 | Nichols |
| 6,547,111 B2 | 4/2003 | French |
| 7,434,712 B2 | 10/2008 | Cook et al. |
| 7,461,765 B2 | 12/2008 | French et al. |
| 8,684,242 B2 | 4/2014 | Pomeroy et al. |
| 8,870,042 B2 | 10/2014 | Clifton |
| 10,473,427 B1 * | 11/2019 | Sereday .............. F41C 33/0254 |
| 11,713,943 B2 | 8/2023 | Ivgi |
| 2006/0156525 A1 | 7/2006 | Jenkins et al. |
| 2007/0181619 A1 | 8/2007 | Seyfert et al. |
| 2011/0266317 A1 | 11/2011 | Clifton |

(Continued)

*Primary Examiner* — Jermie E Cozart
(74) *Attorney, Agent, or Firm* — Emerson, Thomson & Bennett, LLC; Roger D. Emerson (57) ABSTRACT

Provided in this disclosure is a method for manufacturing a customizable holster. Steps are provided of molding inner holster components, including molding internal surfaces that conform to shapes of respective portions of a desired firearm design. Other substeps include molding external surfaces that conform to the shape of portions of an external mating surface of an inner holster. The inner holster components are mated to form an inner holster having an internal contact surface that conforms to the firearm design, to securely receive and retain a respective firearm within the inner holster. An outer holster is molded having an interior defined by an internal mating surface that conforms with the external mating surface of the inner holster. The inner holster is then mated to the outer holster such that the external mating surface of the inner holster is received within the internal mating surface of the outer holster.

20 Claims, 7 Drawing Sheets

(56) References Cited

U.S. PATENT DOCUMENTS

| | | |
|---|---|---|
| 2013/0181021 A1 | 7/2013 | Yarbrough et al. |
| 2014/0048572 A1* | 2/2014 | Yeates ................. F41C 33/0263 |
| | | 29/446 |
| 2015/0247701 A1* | 9/2015 | Faifer ................. F41C 33/0209 |
| | | 224/244 |
| 2018/0142988 A1 | 5/2018 | Tedder et al. |
| 2018/0180380 A1 | 6/2018 | Catner et al. |
| 2020/0292272 A1* | 9/2020 | Treto ................. F41C 33/0209 |
| 2021/0364250 A1* | 11/2021 | DeSantis ............ F41C 33/0209 |
| 2022/0364824 A1 | 11/2022 | Mickels-Silva |

* cited by examiner

METHOD FOR MANUFACTURING A STANDARDIZED OUTER HOLSTER SYSTEM WITH FIREARM SPECIFIC INNER HOLSTER INSERTS

I. BACKGROUND

A. Technical Field

This invention pertains to the field of manufacturing holsters for receiving and carrying firearms. The invention has particular relevance to the field of manufacturing customizable holsters which can be specially designed to suit the needs of a particular user.

B. Description of Related Art

It is known in the art to have holsters for carrying firearms and various other hand-held items or carried gear. Holsters are typically mounted on the user's belt, duty vest, thigh rig, backpack etc. Oftentimes holsters are mounted to surfaces such as vehicle dashboards, nightstands, desks, and other suitable locations.

It is common in the art to manufacture holsters from molded plastic parts. A variety of methods are known in the art of fabricating such molded holsters.

In a two-piece construction method, each half of a holster is molded (or thermoformed) separately, and then fastened together to make one holster unit. Due to manufacturing limitations, the holster walls need to be of relatively consistent thickness or use rib features. Such rib features can impede functionality or cause unsightly protrusions. Ribs on the inside reduce contact area with the firearm, and ribs on the outside collect dirt and can be uncomfortable.

A principal problem with the two-piece construction method is that the fasteners holding the halves together are often the weak link in the holster's construction. Stitching, screws, rivets, eyelets, etc. will generally pull through the holster material, which can result in the holster material failing entirely. Another problem with two-piece construction is that the fasteners require a fair amount of space, often deeming it necessary to make the holster larger than it needs to be to make room for the fasteners.

In a one-piece construction method, a holster can be manufactured in different ways, including: 1) injection molding using a hydraulic core pull; 2) molded with living hinges and secured together at the side opposite of the hinge with fasteners; and 3) thermoformed, heated, and folded, and secured with fasteners.

The most durable product formed by the above methods is injection molding using a hydraulic core pull. However, this manufacturing method is quite limiting from a design standpoint regarding the types and characteristics of features a designer is able to use inside the holster while maintaining the ability to strip the part off of the core during manufacturing. These design limitations are especially hindering in more complicated designs that require internal moving parts.

Designs using living hinges are inexpensive to manufacture but inherit the same problem with fasteners. This design also is limited to certain material choices and results in an inherently weak section along the living hinges where the material needs to be very thin.

Thermoformed and folded methods are very limited in terms of design options, material selections, and overall construction due to their lack of surface precision. Even still, this method requires one end of the material to be fastened to the other, and this is generally where failures will occur when rigorously tested. Thus, the existing holster molding techniques tend to result in a product lacking in mechanical strength.

With one piece and two-piece molded designs, multiple different mold configurations are required to accommodate different firearm designs. The entire holster product is molded, resulting in a large, intricate mold and therefore an expensive fabrication process.

II. SUMMARY

Provided in this disclosure is a method for manufacturing a customizable holster. The method includes steps of molding a first inner holster component, including a substep of molding a first internal surface by forming first internal features that conform to a shape of a first portion of a predetermined firearm design. Another substep includes molding a first external surface by forming first external features that conform to a shape of a first portion of an external mating surface of an inner holster. A similar step is performed of molding a second inner holster component, including a substep of molding a second internal surface by forming second internal features that conform to a shape of a second portion of a predetermined firearm design. Another substep includes molding a second external surface by forming second external features that conform to a shape of a second portion of the external mating surface of the inner holster. The first and second inner holster components are mated to form an inner holster having an internal contact surface defined by the respective first and second internal surfaces, and to also form the external mating surface defined by the respective first and second external surfaces. The internal contact surface is formed with the first and second internal surface features that conform with a shape of the predetermined firearm design, in order to securely receive and retain a respective firearm within the inner holster. An outer holster is molded having an interior defined by an internal mating surface formed with internal features that conform with the external mating surface of the inner holster. The inner holster is mated to the outer holster such that the external mating surface of the inner holster is received within the internal mating surface of the outer holster.

In another aspect, the molding of the first and second holster components includes forming respective first and second internal features that respectively conform to a left and a right portion of a firearm.

In yet another aspect, substeps of molding the first and second internal surfaces include first substeps of forming the first and second internal features that respectively conform to shapes of first and second portions of a first predetermined firearm design. Second substeps are also performed of forming the first and second internal features that respectively conform to shapes of first and second portions of a second predetermined firearm design. The second predetermined firearm design corresponds to a different firearm than the first predetermined firearm design.

In still another aspect, the mating of the inner holster to the outer holster includes mating a first inner holster having the first and second internal features that respectively conform to the shapes of the first and second portions of the first predetermined firearm design to a first outer holster to form a first holster for securely receiving a first firearm corresponding to the first predetermined firearm design. This aspect also includes separately mating a second inner holster having the first and second internal features that respectively conform to the shapes of the first and second portions of the second predetermined firearm design to a second outer holster to form a second holster for securely receiving a second firearm corresponding to the second predetermined firearm design. In this manner, two separate holsters for distinctly different firearms can be created using the same outer holster with different but similarly created inner holster components.

In a further aspect, a step can be performed of removing the first inner holster from the first outer holster and mating the first inner holster with a third outer holster, thereby replacing the first outer holster. Similarly, another step can be performed of removing the first inner holster from the first outer holster and mating a third inner holster into the first outer holster. The third inner holster has a predetermined firearm design different from that of the first inner holster, thereby interchangeably switching out different inner holsters into the outer holster.

In another further aspect, the molding of the outer holster includes forming a symmetrical external surface of the outer holster having two opposing mounting surfaces each configured to receive a mounting structure for securing the outer holster to a holster mount. The forming of the symmetrical external surface of the outer holster includes forming mounting holes onto each of the two opposing mounting surfaces. In this manner, the mounting holes are configured to receive fasteners for securing the mounting structure.

In yet another aspect, the forming of the symmetrical external surface of the outer holster includes forming left and right opposing mounting surfaces. The forming of the left and right opposing mounting surfaces includes forming mounting holes onto one of the two opposing mounting surfaces, wherein the mounting holes are configured to receive fasteners for securing the mounting structure. The forming of mounting holes includes punching out the mounting holes in a secondary operation to configure the holster in either a right or left handed design. Further steps include aligning the mounting holes with inner holster mounting holes formed on at least one side of the inner holster. The mounting holes and inner holster mounting holes are aligned to receive fasteners for securing to the mounting structure.

In still another further aspect, the substeps of molding the first and second internal surfaces include forming first and second internal features that conform to the shapes of the first and second portions of the predetermined firearm design, including an optional peripheral component mounted on the firearm. Preferably, the optional peripheral firearm component formed by the substeps of molding can be a firearm-mounted light.

In a further aspect, the substeps of molding the first and second internal and external surfaces includes forming surface features for retaining a firearm retention mechanism. Additional steps are performed of attaching one or more firearm retention mechanism components to the surface features. The steps of attaching the one or more firearm retention components includes attaching a retaining hood to one of the inner or outer holster, for securing the firearm into the inner holster in an engagement position. The steps of attaching the firearm retention components includes attaching one of a right and left handed ejector port auto locking mechanism to the first and second internal surfaces of the inner holster for securing the firearm into the inner holster in an engagement position.

In another further aspect, additional steps include rotatably mounting an optic shroud to the surface features molded into the external surface of the outer holster, for covering and protecting a firearm-mounted optic from impact and debris. The forming of the surface features on the first and second internal surfaces includes forming detents for engaging the optic shroud and to lock the optic shroud into a closed position.

In yet another further aspect, further steps include attaching a bottom cap to a bottom portion of both the inner and outer holster for further joining the inner and outer holsters together and for protecting the edges of a material covering placed along the exterior surface of the outer holster. Also, the substeps of molding the first and second internal surfaces further include respective substeps of molding internal extensions for contacting and supporting the firearm.

According to an aspect, the present method generally overcomes problems associated with holsters manufactured by one piece and two-piece construction.

According to another aspect, the present method specifically overcomes problems with designs including living hinges, preventing problems with weak sections where material needs to be very thin.

According to yet another aspect, the present method results in a product having mechanical strength, not prone to the known failures resulting from fasteners.

According to still another aspect, the present method reduces manufacturing costs associated with multiple different mold configurations.

According to a further aspect, the present method reduces in a standardized product that can be customized to suit the various specific needs of a range of different customers, while employing substantially similar tooling.

Other benefits and advantages of this invention will become apparent to those skilled in the art to which it pertains upon reading and understanding of the following detailed specification.

III. BRIEF DESCRIPTION OF THE DRAWINGS

The disclosed customized holster may take physical form in certain parts and arrangement of parts, embodiments of which will be described in detail in this specification and illustrated in the accompanying drawings which form a part hereof and wherein.

IV. DETAILED DESCRIPTION

Reference is now made to the drawings wherein the showings are for purposes of illustrating embodiments of the article only and not for purposes of limiting the same, and wherein like reference numerals are understood to refer to like components.

Figure 1:
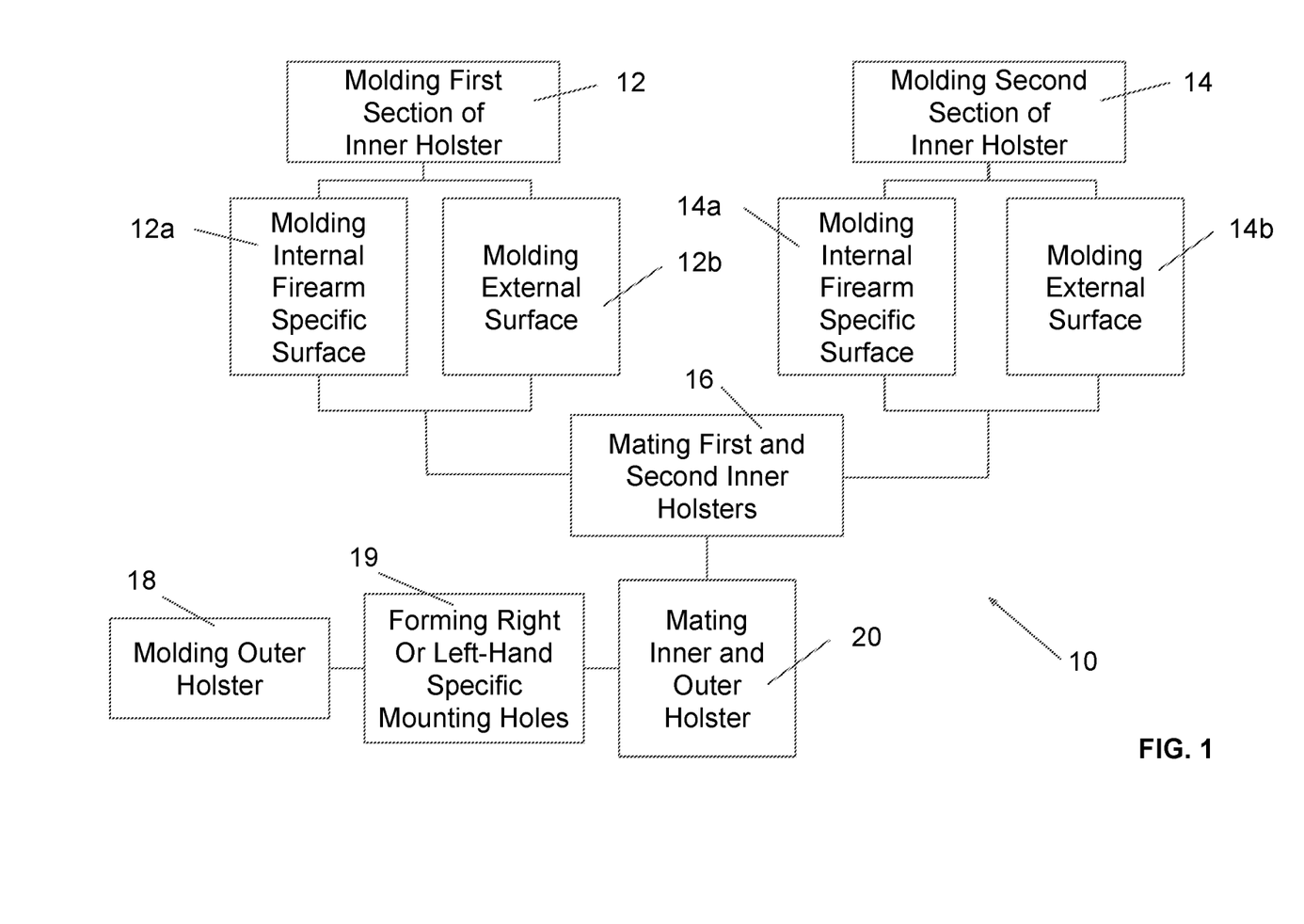
FIG. 1 is a block diagram depicting the steps of the present method in accordance with an exemplary embodiment.

As shown in the block diagram of FIG. 1, a method is disclosed herewith for manufacturing a holster, preferably by known plastic molding techniques such as injection molding with hydraulic core pull, or by the thermoformed and folded method, etc. An exemplary embodiment of a product formed by the method is shown in FIGS. 2A, 2B, 2C, 2D, 3A, 3B, 4A, 4B, 5A, 5B, 5C, 6A, 6B, 7A, 7B, 7C, and 7D. An exemplary holster that can be formed by the present method is described co-pending patent application U.S. Ser. No. 18/463,496 entitled STANDARDIZED OUTER HOLSTER SYSTEM AND CORRESPONDING FIREARM SPECIFIC INNER HOLSTER INSERTS, filed Sep. 8, 2023, the entirety of the disclosure of which is hereby incorporated by reference.

As depicted in the block diagram of FIG. 1, the present method 10 includes a step 12 of molding a first inner holster component. This step 12 includes a substep 12a of molding a first internal surface by forming first internal features that conform to a shape of a first portion of a predetermined firearm design. The step 12 also includes another substep 12b of molding a first external surface by forming first external features that conform to a shape of a first portion of an external mating surface of an inner holster. The substeps 12a, 12b are preferably performed simultaneously by employing a mold having a first mold surface shaped into the first internal features, and an opposing second mold surface shaped into the first external features. In this manner, the step 12 including substeps 12a, 12b can form the first inner holster component in a single operation.

As also depicted in the block diagram of FIG. 1, the present method 10 also includes a step 14 of molding a second inner holster component. This step 14 similarly includes a substep 14a of molding a second internal surface by forming second internal features that conform to a shape of a second portion of the predetermined firearm design. The step 14 also includes another substep 14b of molding a second external surface by forming second external features that conform to a shape of a second portion of an external mating surface of the inner holster. The substeps 14a, 14b are also preferably performed simultaneously by employing a mold having a first mold surface shaped into the second internal features, and an opposing second mold surface shaped into the second external features. In this manner, the step 14 including substeps 14a, 14b can form the second inner holster component in a single operation.

Figure 2A:
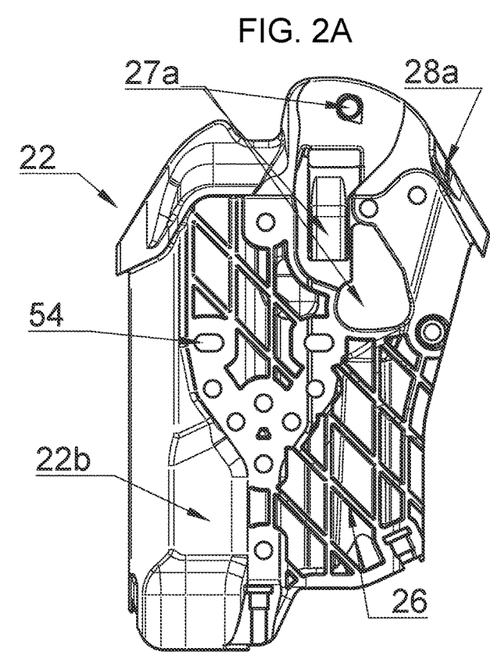
FIGS. 2A, 2B, 2C, and 2D are respective exterior and interior views of first and second holster components fabricated in accordance with an exemplary embodiment of the present method.
Figure 2B:
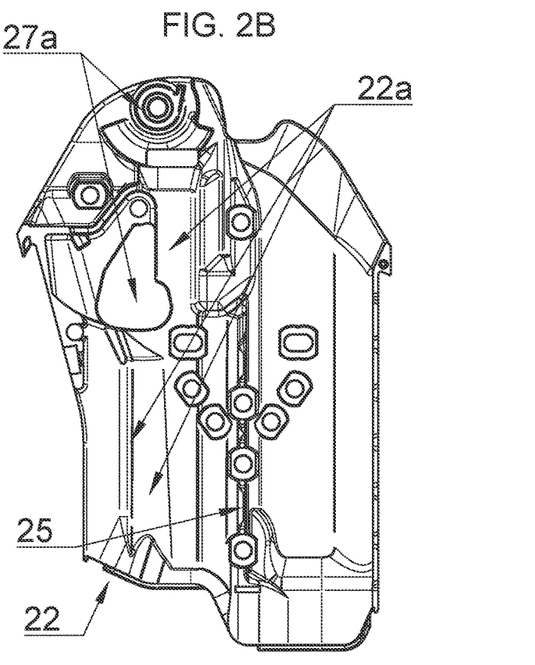
Figure 2C:
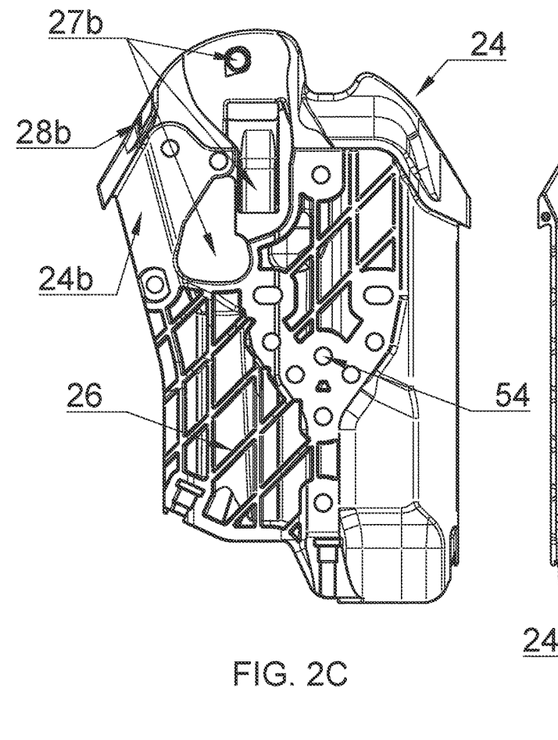
Figure 2D:
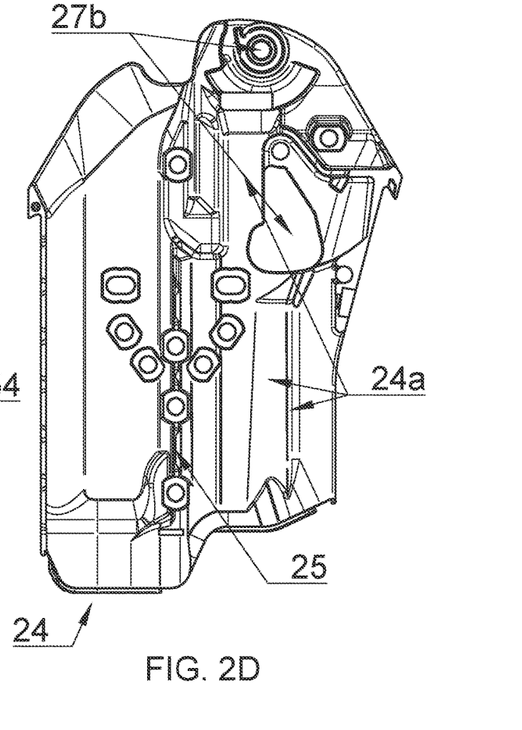

FIGS. 2A, 2B, 2C, and 2D depict the basic configuration of components of an inner holster 30 fabricated in accordance with the present method. In particular, FIGS. 2A and 2B show respective exterior and interior views of a first inner holster component 22. FIGS. 2C and 2D show respective exterior and interior views of a second inner holster component 24. The internal contact surfaces 22a, 24a are formed by the respective molding substeps onto an interior of each of the first and second inner holster components 22, 24. The internal contact surfaces 22a, 24a represent the first and second internal surfaces including the first and second internal features that conform to a shape of the first and second portions of the predetermined firearm design in accordance with the present method. The internal contact surfaces 22a, 24a are thereby conformed to the shape of the predetermined firearm design, in order to securely receive and retain a firearm 60 according to the respective predetermined firearm design within the inner holster 30 upon assembly.

As particularly visible in FIGS. 2A and 2C, the first and second inner holster components 22, 24 have certain surface features formed on their respective exterior surfaces 22b, 24b which are formed by the respective molding substeps onto on the exterior of each of the first and second inner holster components 22, 24, to create the respective first and second external surfaces by forming the respective first and second external features that conform to the shape of first and second portions of an external mating surface 32 of an inner holster 30, as explained in greater detail hereinbelow.

With respect to the embodiment depicted in FIGS. 2A, 2B, 2C, 2D, 3A, 3B, 7A, 7B, 7C, and 7D the steps 12, 14 of molding of the first and second holster components includes forming respective first and second internal features that respectively conform to a left and a right portion of a firearm. In this manner, the first and second inner holster components 22, 24 correspond to a right and left inner holster components 22, 24 that respectively conform to a right left and a right portion of a firearm 60. The internal contact surfaces 12a, 14a also include internal extensions 25 for contacting and supporting the firearm 60 in such a way that the presence, style, or lack of a weapon mounted light 55 does not affect the fitment of the firearm 60 in the holster 20. The internal extensions 25 contact and support the firearm 60 in order to house various lights and optics via securing surfaces that are placed into contact with the firearm.

As is shown in FIGS. 2A, 2B, 2C, 2D, and 5A the first inner holster component 22 and second inner holster component 24 are formed to have necessary surface features 27a, 27b to accommodate the implementation of firearm retention mechanisms including components such as a hood 34 and/or an ejector port auto-locking mechanism 35. An exemplary firearm retention mechanism is described in co-pending patent application U.S. Ser. No. 18/463,398 entitled FIREARM RETENTION MECHANISM FOR A HOLSTER, filed Sep. 8, 2023, the entirety of the disclosure of which is hereby incorporated by reference. Both the hood 35 and the ejector port auto-locking mechanism 35 serve to block rearward movement of the firearm 60 and thus retain the firearm 60 in an engagement position within the holster 20 and can be used separately or in conjunction with one another. Thus, the present substeps 12a, 14a of molding the first and second internal and external surfaces include forming surface features for retaining a firearm retention mechanism, further including steps of attaching one or both of the firearm retention mechanism components 34, 35 to the surface features 27a, 27b.

With continued reference to FIGS. 2A, 2B, 2C, 2D, and 5A, the steps of attaching the firearm retention component(s) specifically include attaching the retaining hood 34 to either the inner or outer holster, for securing the firearm 60 into the inner holster 30 in an engagement position. The steps of attaching the firearm retention component(s) can also specifically include attaching either a right or left handed ejector port auto locking mechanism 35 to the first and second internal surfaces of the inner holster 30 for securing the firearm 60 into the inner holster 20 in an engagement position. As will be explained in greater detail hereinbelow, the method also includes rotatably mounting an optic shroud to the surface features molded into the external surface of the outer holster 40, for covering and protecting a firearm-mounted optic from impact and debris. Also, the forming of the surface features on the first and second internal surfaces includes forming detents for engaging the optic shroud and to lock the optic shroud into a closed position.

As is shown in FIGS. 2B, 2D, 3A, 3B, 4A, 4B, 5A, 5B, and 5C, the internal contact surfaces 22*a*, 24*a* can be formed in a variety of different configurations, so that the predetermined firearm design can be selected from one of a plurality of different firearm designs. Each respective different firearm design can have a respective plurality of different internal contact surfaces 22*a*, 24*a* in order that a particular shape of contact surface can be formed to conform with a respective shape and size of a specific firearm design. In this manner the holster 20 can be perfectly designed in order to accommodate the specific firearm design. Moreover, a plurality of different holster designs can be fabricated by creating respective different inner holster components 12, 14 corresponding to each firearm design.to create respective inner holsters 30. These different inner holsters 30 correspond to the different firearm designs that can be interchangeably switched out into the same outer holster 40, as explained in greater detail hereinbelow. In this manner, the right and left inner holster components 22, 24 can be customized for various types of firearms, where it is to be appreciated that such various firearms be of comparable sizes and other dimensions such as can be received within the same size outer holster 40.

With continued reference to FIG. 1, as well as FIGS. 2A, 2B, 2C, 2D, 3A, and 3B, the present method 10 includes a step 16 of mating the first and second inner holster components 22, 24 to form the inner holster 30 having the internal contact surface 31 defined by the combination of the respective first and second internal surfaces 22*a*, 24*a*. The mating step 16 also forms the external mating surface 32 defined by the respective first and second external surfaces 22*b*, 24*b*. The internal contact surface 31 is formed with the first and second internal surface features that conform with a shape of the predetermined firearm design, in order to securely receive and retain a respective firearm within the inner holster.

Figure 3A:
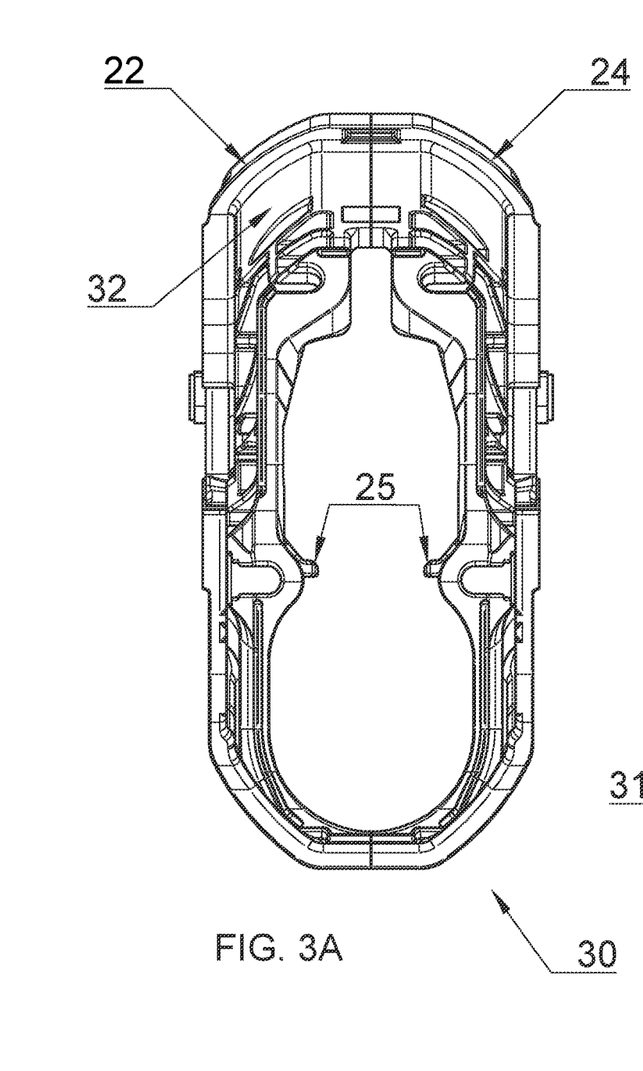
FIGS. 3A and 3B are respective overhead and perspective views of an inner holster fabricated in accordance with an exemplary embodiment of the present method.
Figure 3B:
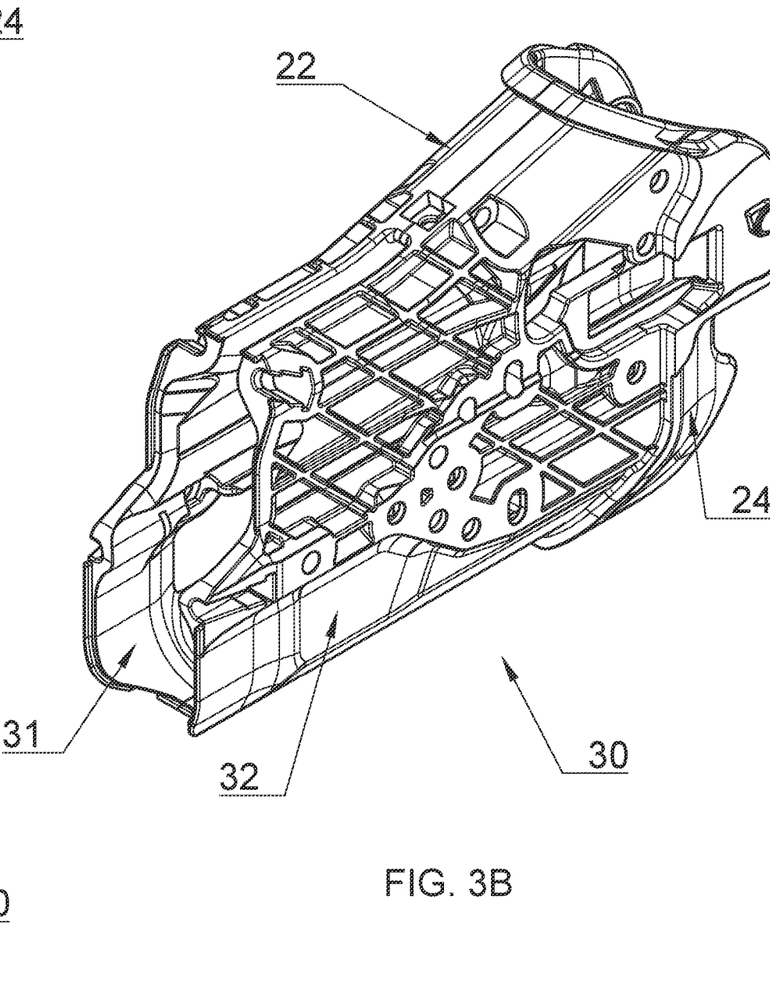

As shown in FIGS. 3A and 3B, following the step 16 of mating, the first and second inner holster components 22, 24 are configured in a mating arrangement to form a complete inner holster 30 as fabricated in accordance with the present method. The exterior of the assembled inner holster 30 defines the external mating surface 32 upon mating of the first and second inner holster components 22, 24 to form the inner holster 30.

Figure 4A:
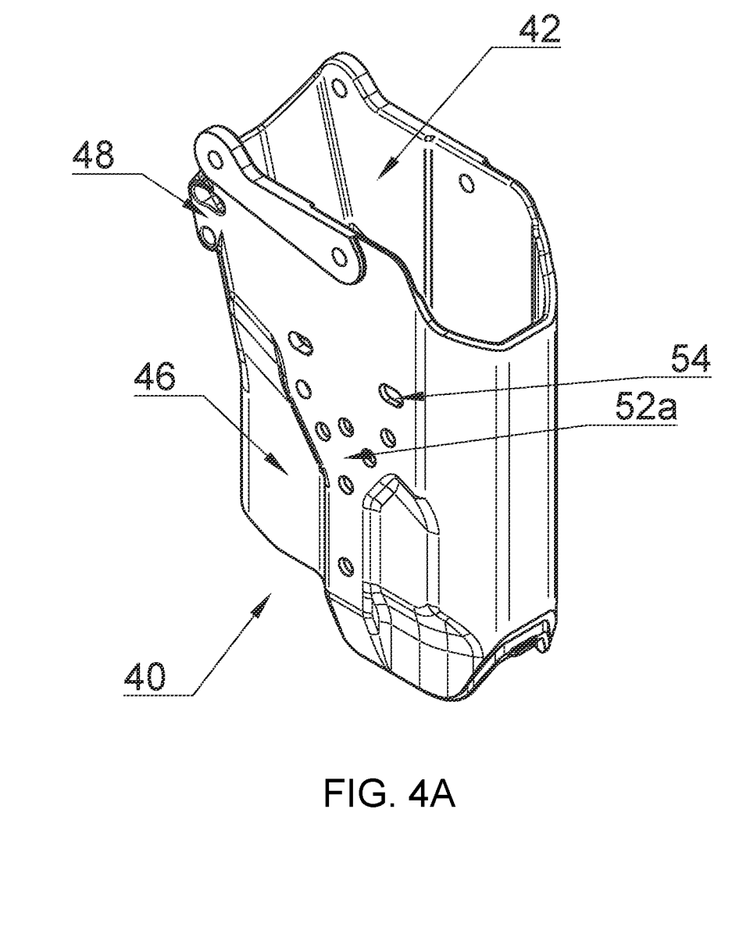
FIGS. 4A and 4B are respective top perspective and bottom perspective views of an outer holster fabricated in accordance with an exemplary embodiment of the present method.
Figure 4B:
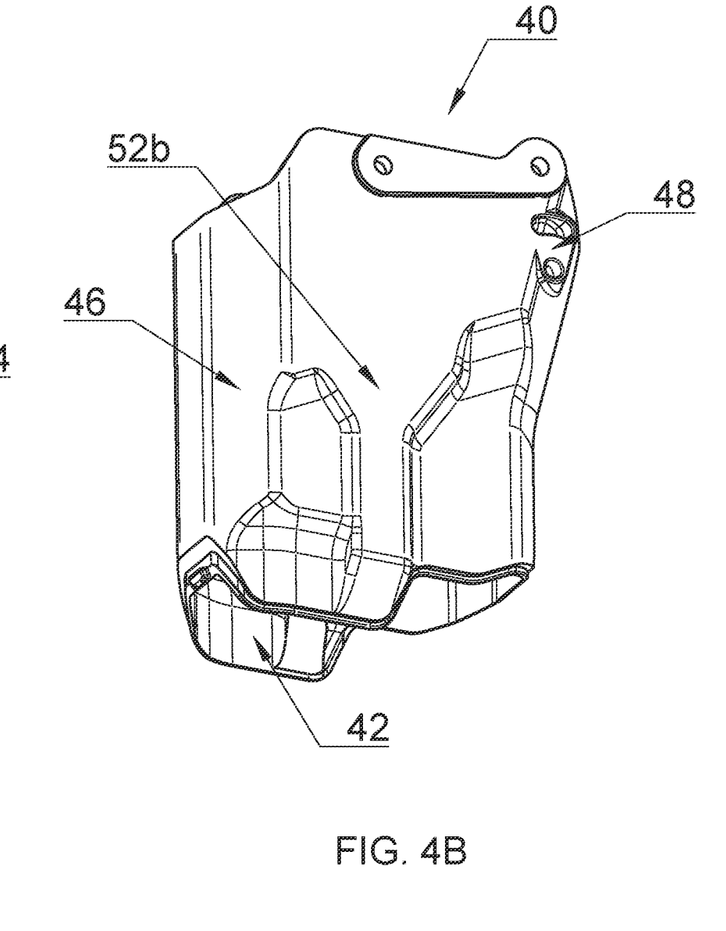

With further reference to FIGS. 1, 3A, 3B, 4A, and 4B a separate step 18 is performed of molding an outer holster 40 having an interior defined by an internal mating surface 42 formed with internal features that conform with the external mating surface 32 of the inner holster 30. As indicated in FIGS. 4A and 4B, the molding step 18 includes molding the outer holster 40 to form corresponding surface features on the internal mating surface 42 of the outer holster 40 so that these respective surface features fit together in a mating fashion with the external mating surface 32 of the inner holster 30.

As also indicated in FIGS. 1, 2A, 2C, 5B, and 5C, the method 10 includes a step 20A of mating the inner holster 30 to the outer holster 40 such that the external mating surface 32 of the inner holster 30 is received within the internal mating surface 42 of the outer holster 40. Thus, the internal mating surface 42 of the outer holster 40 is configured so as to encircle the first and second holster components 22, 24 and to be received within the external mating surface 32 of the inner holster 30, and thereby securely receive and retain the inner holster 30 within the outer holster 40. In this manner, the dual-layer design of the inner/outer holster configuration allows for supporting ribs 26 to be formed on the external mating surface 32 and hidden between the outer and inner holsters, leaving the exterior surfaces to remain aesthetically pleasing and easy to clean, and the interior surface to have maximum contact surface with the firearm 60. Moreover, the internalization of these structural ribs allows for external surface 46 of outer holster 40 to be optionally adorned with a material covering, such as fabric, leather, etc. This is especially advantageous as certain police departments require their personnel's gear to have a certain finish on their exterior. Generally, with injection molded components, this requires duplicate molds of the components to be made to achieve these different colors and surface finishes. The method 10 allows for this additional development cost to be avoided as the outer surface 46 is designed to allow for this optional material covering to be added after molding.

As shown in FIGS. 2A, 2B, 2C, 2D, 3A, 3B, 4A, 4B, 5A, 5B, and 5C, a three piece "inner and outer holster construction" formed by the present method 10 has superior advantages to the one piece and two-piece construction methods known in the prior art. The three piece "inner and outer holster construction" utilizes three components that work together to create a finished holster 20 that has superior strength and function as compared to other holster construction methods. As disclosed hereinabove, the inner holster 30 is made from the first and second inner holster components 22, 24 having the contact surfaces 22*a*, 24*a* to securely hold the firearm 60, as well as other features that perform essential duties within the holster. The first and second inner holster components 22, 24 can be plastic molded components created by known plastic molding techniques such as injection molding, or by the thermoformed and folded method, etc.

With continued reference to FIGS. 2A, 2B, 2C, 2D, 3A, 3B, 4A, 4B, 5A, 5B, and 5C, the outer holster 40 formed by the present method 10 is of a one-piece construction (formed by either injection molding with hydraulic core pull or the thermoformed and folded method) and encircles the inner holster 30, providing the strength to hold the inner holster components 22, 24 together and in position. The inner holster halves 22, 24 are paired and located together, and then inserted into the outer holster 40, which acts to bind the two inner holster components 22, 24 together. In addition to providing superior strength, this technique allows the designer to make better contact with the firearm 60 for a higher quality end product.

In the components shown in FIGS. 2A, 2B, 2C, 2D, 3A, 3B, 4A, 4B, 5A, 5B, 5C, 6A, 6B, 7A, 7B, 7C, and 7D, the present method 10 can include an additional step of using fasteners 47 to bind together the inner holster 30 to the outer holster 40, as well as an intermediate fastener to hold the inner holster 30 together during manufacturing for ease of assembly. Such fasteners can be used for securing various exterior covers 56, top caps 51, bottom caps 33, and attachments 53 to the holster 20. In the case of the bottom cap 33, it is serving to protect the edges of the optional material covering placed on external surface 46 from wear, but also acts to further bind the inner and outer holster together in their proper position and alignment. In addition, in many cases the fasteners 47 are under a shear load rather than a tensile load, with the binding post aligning the inner and outer holsters 30, 40 much like a dowel pin. In practical experience, this has been found to enhance the strength of the assembly, as the heads of the fasteners will not be loaded in such a way that they will be pulled through the polymer substrate.

As shown in FIGS. 4A, 4B, 6A, 6B, 7A, 7B, 7C, and 7D, holster 20 can include an optic shroud 58, for rotatably covering and protecting from impact or debris a firearm mounted optic 57 attached to a user's firearm 60 once the firearm is fully placed into an engagement position within the holster 20. This optic shroud 58 mounts onto holster 20 by means of the mounting structures 48 on opposing sides of the exterior surface 46 of outer holster 40. These mounting structures 48 serve to provide an axis of rotation to the optic shroud 58 as well as limit its rotational travel to a functional and practical range of motion. The optic shroud 58 engages with detent features 28a and 28b (located on the exterior surface of the inner holster components 22 and 24, respectively) upon closing to detent itself into the closed position to prevent unwanted rotation into the open position. The optic shroud 58 can be rotated into the open position by the hood 34 being rotated to its disengaged position, by rearward movement of the firearm 60 and/or firearm mounted optic 57 in cases where the hood 34 is not used or displaced manually by the user.

As is evident especially from FIGS. 2A, 2B, 2C, 2D, 3A, and 3B, the present method 10 can include an embodiment having specific substeps 12a, 14a of molding the first and second internal surfaces 22a, 24a. A first set of substeps 12a, 14a can be performed of forming the first and second internal features 22a, 24a that can be fashioned in a specific shape of a mold in order to respectively conform to shapes of first and second portions of a first predetermined firearm design. A second set of substeps 12a, 14a can be performed in parallel of forming the first and second internal features that can be fashioned in another specific shade of a mold in order to respectively conform to shapes of first and second portions of a second predetermined firearm design. In this embodiment of the method 10, the second predetermined firearm design corresponds to a different firearm than the first predetermined firearm design. In this manner, the same substeps 12a, 14a can be performed using different molds in order to produce respectively different inner housings 30 corresponding to different firearm designs, thereby resulting in a standardized inner housing 30 design for different firearm types that can be universally employed with a standardized outer housing 40.

Figures 5A, 5B, 5C:
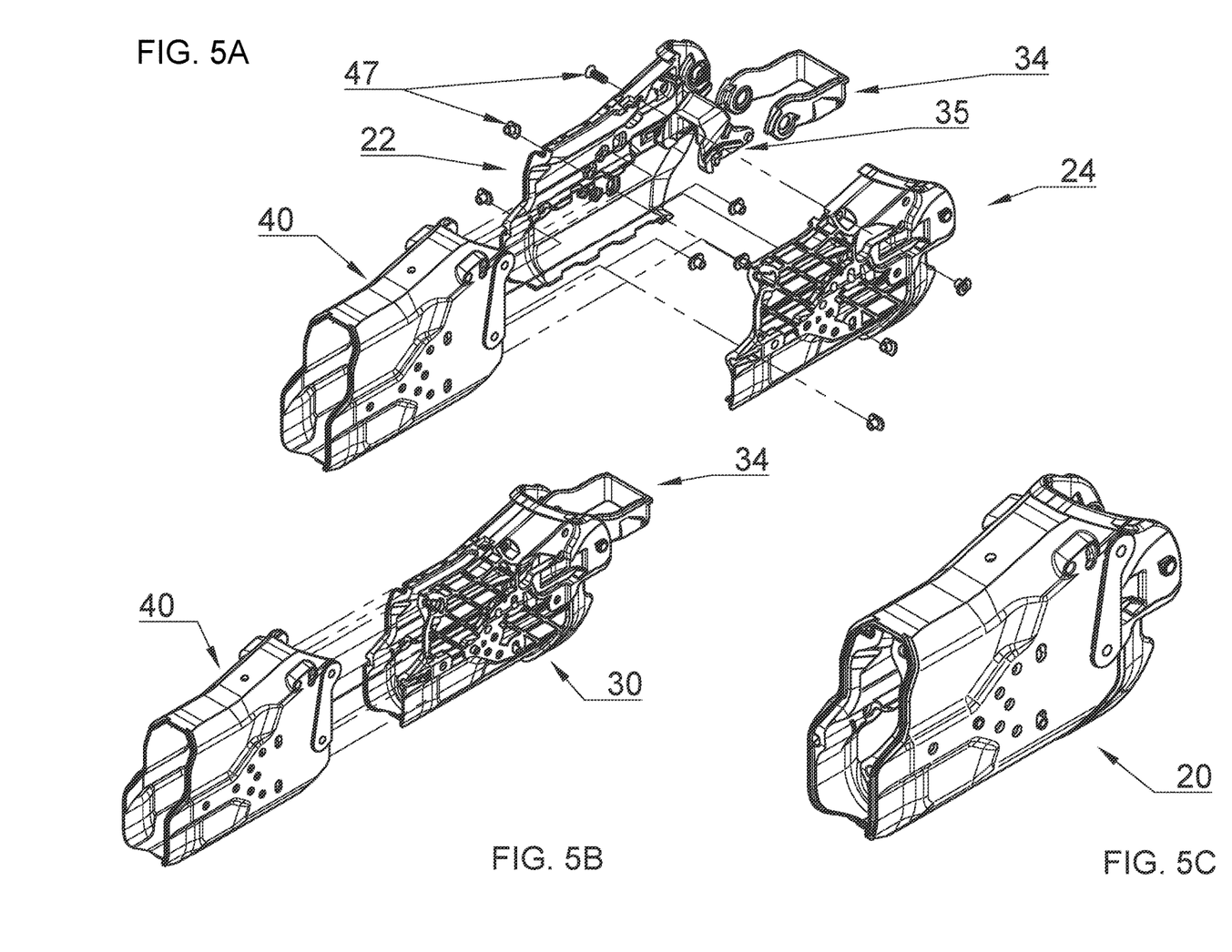
FIGS. 5A, 5B, and 5C are perspective views of the assembly process of the inner holster sections to become an inner holster, and the inner holster to the outer holster fabricated in accordance with an exemplary embodiment of the present method.
Figure 6A:
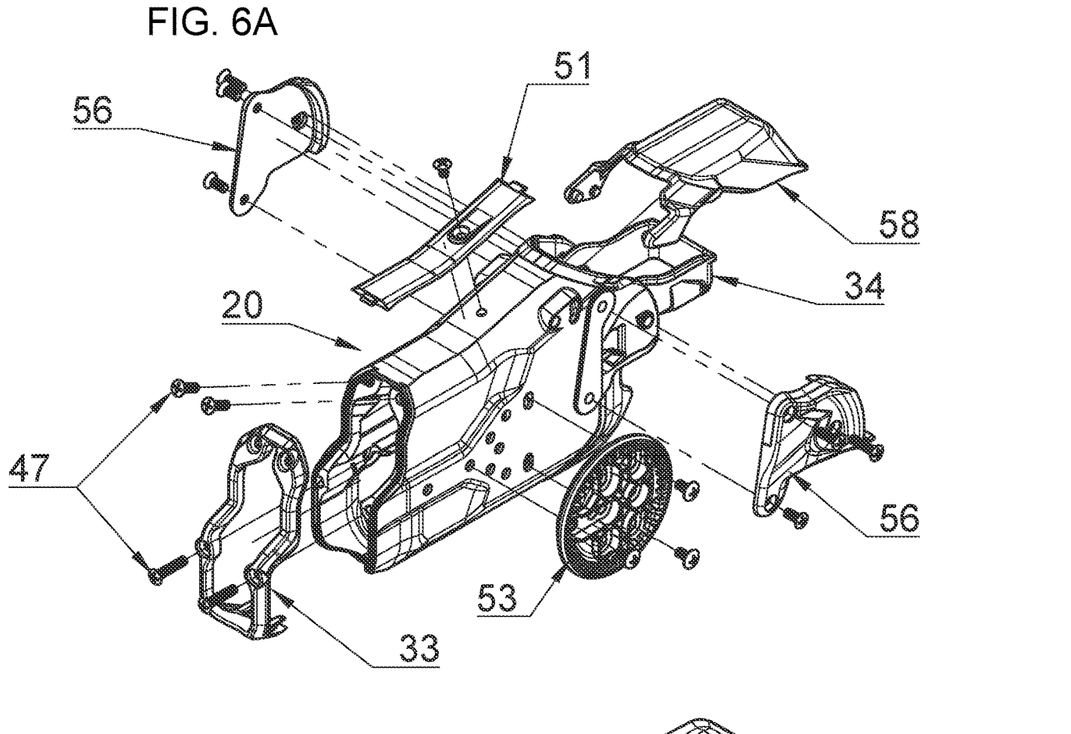
FIGS. 6A and 6B are perspective views of the assembly process of the holster and some of its optional accessories fabricated in accordance with an exemplary embodiment of the present method.
Figure 6B:
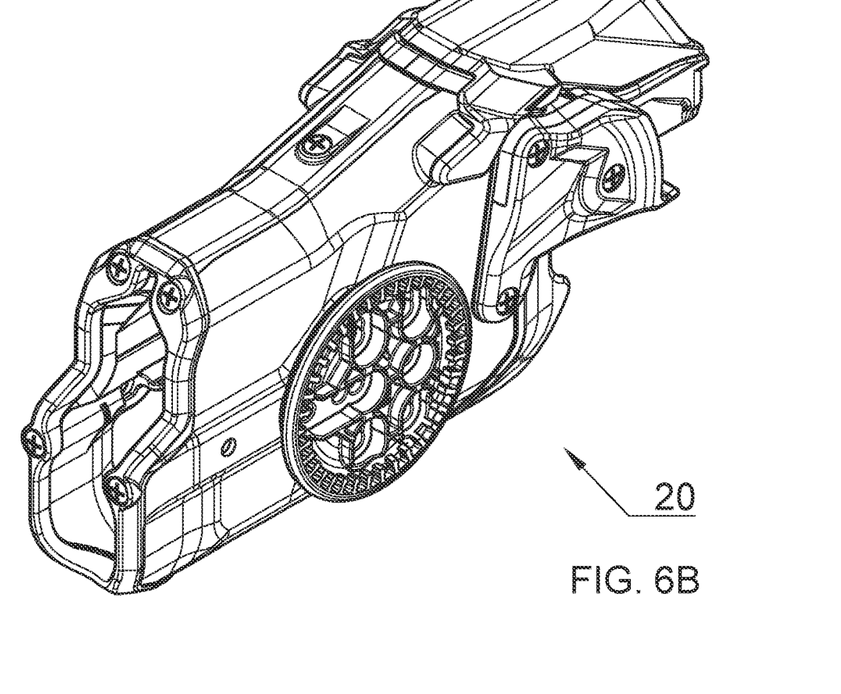

As further follows from the holster 20 shown in FIGS. 5A, 5B, and 5C, the present method 10 can optionally include a step 16 of the mating of the inner holster 30 to the outer holster 40 including mating a first instance of an inner holster 30 of a specific style having the first and second internal features that respectively conform to the shapes of the first and second portions of the first predetermined firearm design to a first instance of an outer holster 40 to form a first holster 20 for securely receiving a first firearm 60 corresponding to the first predetermined firearm design, which can be a specific type of firearm. In a parallel operation, another step 16 of the mating of the inner holster 30 to the outer holster 40 including mating a second instance of an inner holster 30 having the first and second internal features that respectively conform to the shapes of the first and second portions of the second predetermined firearm design to a second instance of an outer holster to form a second holster for securely receiving a second firearm 60 corresponding to the second predetermined firearm design, which can be a different specific type of firearm from the first firearm. In this manner, two or more separate types of holsters 20 can be fashioned with the present method to respectively correspond to two more separate types of firearms 60.

Further options are available to the holster 20 shown in FIGS. 5A, 5B, and 5C formed by the present method 10. In the embodiment described in the paragraph above, an optional step can be performed of removing the first inner holster 30 from the first outer holster 40 and subsequently mating the first inner holster 30 with a third outer holster 40, thereby replacing the first outer holster 40. This optional step can be performed in an instance where the outer holster 40 becomes damaged but the inner holster 30 is undamaged. This can result in savings to the end user, resulting in savings of material costs compared to replacing the entire holster 20. This can be especially economical for police departments and other law enforcement bodies which purchase large quantities of holsters for their personnel.

Additional options are available to the holster 20 shown in FIGS. 5A, 5B, and 5C formed by the present method 10. In the aforementioned preceding embodiment, another optional step can be performed of removing the first inner holster 30 from the first outer holster 40 and mating a third inner holster 30 into the first outer holster 40. This can be done to replace a damaged inner holster 30. Moreover, this can especially be done in an instance where the third inner holster 30 has a predetermined firearm design different from that of the first inner holster, thereby interchangeably switching out different inner holsters 30 into the outer holster 40. This results in a fully modular, interchangeably holster system which can be readily repaired or modified without requiring the purchase of an entire new holster, resulting in cost savings, especially for police departments and other law enforcement bodies which purchase large quantities of holsters for their personnel. In this manner, multiple inner holster 20 models can be made to fit with the same outer holster 30 and its accessories, also allowing for a cost savings during manufacturing and development.

An additional aspect is depicted in the holster 20 shown in FIGS. 2A, 2C, 4A, 4B, and 6A formed by the present method 10. The step 18 of molding the outer holster can include forming a symmetrical external surface 46 of the outer holster 40 having two opposing mounting surfaces 52a, 52b each configured to receive a mounting structure for securing the outer holster 40 to a holster mount. The mounting structures can be mounting holes 54 for securing the holster 20 to a suitable holster mount such as to a belt attachment 53, a dashboard, etc. The step 18 that includes forming the symmetrical external surface 46 of the outer holster 40 does not include forming all of the mounting holes 54 onto each of the two opposing mounting surfaces.

The mounting holes 54 designated to secure the holster 20 to a belt attachment or the like are formed during step 19 through drilling or punching. In any event, the mounting holes 54 are configured to receive fasteners through the mounting holes 54 located in the inner holster for securing the belt attachment or the like. It is to be appreciated that the forming of the symmetrical external surface 46 of the outer holster 40 can include forming left and right opposing mounting surfaces. In this manner, the mounting structures can result in a reversible holster 20 in which the holster 20, which can be easily configured to accommodate either left or right handed users. This would be advantageous and economical due to police departments requiring that holsters be available for their left-handed personnel, although there exists only a small percentage of left-handed users. Generally, this requires that multiple components be molded in a dedicated left-hand configuration, often doubling tooling investments. However, this investment is not necessary in regard to holster 20, due to the inner holster components 22 and 24 having mounting structures and mounting holes on both opposing sides and the outer holster 40 having mounting structures on both sides, with the mounting holes 54 being punched into either the right or left mounting structure in a secondary process which designates it as either a right or left-handed outer holster. This outer holster 40, once paired with an inner holster 30, then creates a holster 20 which is then right or left-hand specific, without the need for right or left-hand specific tooling.

Figure 7A:
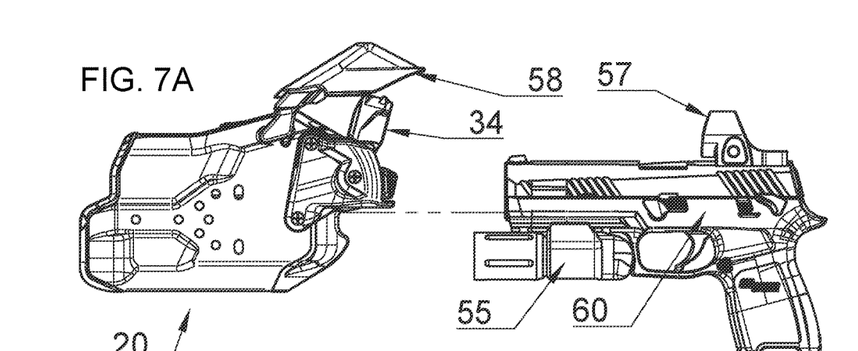
FIGS. 7A and 7C are side views of the holster and a firearm in a respectively removed and inserted position, as FIGS. 7B and 7D are perspective views of the holster and firearm in a respectively removed and inserted position, fabricated in accordance with an exemplary embodiment of the present method.
Figure 7B:
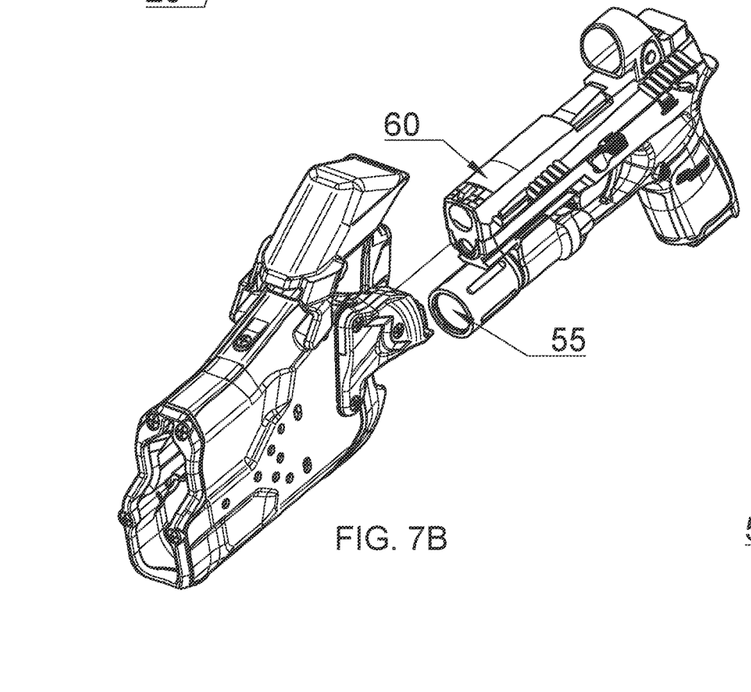
Figure 7C:
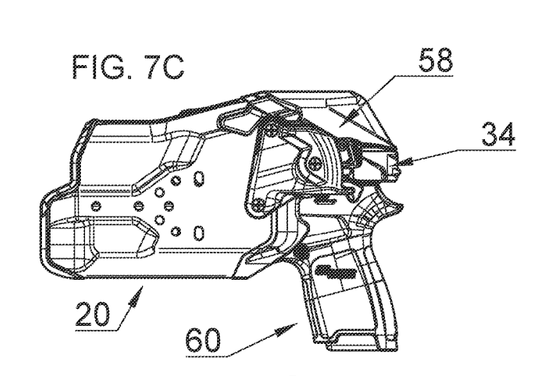
Figure 7D:
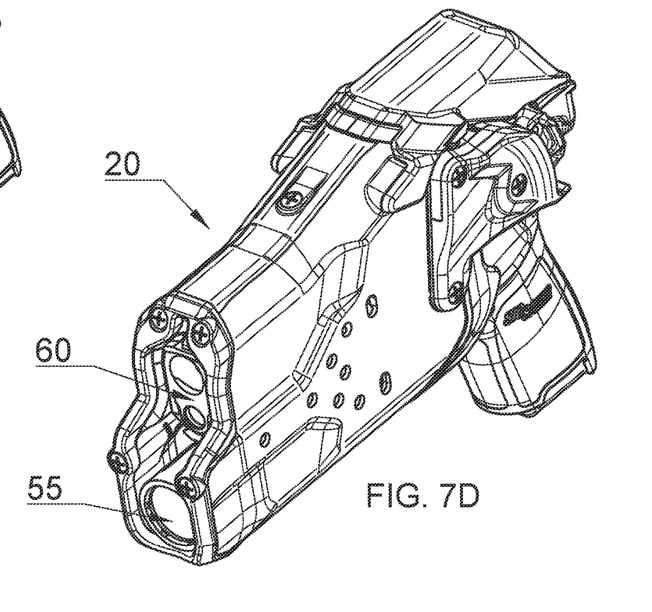

The method of FIG. 1 can be adapted to accommodate many optional variations, not only in firearm design, but in peripheral components that can be selectively included on a firearm 60. The substeps 12a, 14a of molding the first and second internal surfaces 22a 24a can include forming first and second internal features that conform to the shapes of the first and second portions of the predetermined firearm design that include an optional peripheral component mounted on the firearm, particularly including a firearm-mounted light 55, as shown in FIG. 7B. For example, different law enforcement jurisdictions can have different requirements for firearm-mounted lights 55, including different placement along the body of the firearm 60. This can be accommodated by minor variations to mold design means of the internal extensions 25, rendering these differences inconsequential rather than requiring a completely different holster design, as with previous methods. This can also be especially economical for police departments and other law enforcement bodies which purchase large quantities of holsters for their personnel, whereas their personnel may desire to have an array of different firearm mounted lights 55 in varying positions in front of the trigger guard of their firearm.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed:

1. A method for manufacturing a holster, comprising steps of:
    molding a first inner holster component including:
        a substep of molding a first internal surface by forming first internal features that conform to a shape of a first portion of a predetermined firearm design,
        a substep of molding a first external surface by forming first external features that conform to a shape of a first portion of an external mating surface of an inner holster;
    molding a second inner holster component including:
        a substep of molding a second internal surface by forming second internal features that conform to a shape of a second portion of a predetermined firearm design,
        a substep of molding a second external surface by forming second external features that conform to a shape of a second portion of the external mating surface of the inner holster;
    mating the first and second inner holster components to form an inner holster having an internal contact surface defined by the respective first and second internal surfaces, and to also form the external mating surface defined by the respective first and second external surfaces, wherein the internal contact surface is formed with the first and second internal surface features that conform with a shape of the predetermined firearm design, in order to securely receive and retain a respective firearm within the inner holster;
    molding an outer holster having an interior defined by an internal mating surface formed with internal features that conform with the external mating surface of the inner holster; and
    mating the inner holster to the outer holster such that the external mating surface of the inner holster is received within the internal mating surface of the outer holster.

2. The method of claim 1, wherein the molding of the first and second holster components comprises forming respective first and second internal features that respectively conform to a left and a right portion of a firearm.

3. The method of claim 1, wherein the substeps of molding the first and second internal surfaces comprises:
    first substeps of forming the first and second internal features that respectively conform to shapes of first and second portions of a first predetermined firearm design; and
    second substeps of forming the first and second internal features that respectively conform to shapes of first and second portions of a second predetermined firearm design, wherein the second predetermined firearm design corresponds to a different firearm than the first predetermined firearm design.

4. The method of claim 3, wherein the mating of the inner holster to the outer holster further comprises:
    mating a first inner holster having the first and second internal features that respectively conform to the shapes of the first and second portions of the first predetermined firearm design to a first outer holster to form a first holster for securely receiving a first firearm corresponding to the first predetermined firearm design; and
    mating a second inner holster having the first and second internal features that respectively conform to the shapes of the first and second portions of the second predetermined firearm design to a second outer holster to form a second holster for securely receiving a second firearm corresponding to the second predetermined firearm design.

5. The method of claim 4, further comprising removing the first inner holster from the first outer holster and mating the first inner holster with a third outer holster, thereby replacing the first outer holster.

6. The method of claim 4, further comprising removing the first inner holster from the first outer holster and mating a third inner holster into the first outer holster, wherein the third inner holster has a predetermined firearm design different from that of the first inner holster, thereby interchangeably switching out different inner holsters into the outer holster.

7. The method of claim 1, wherein the molding of the outer holster further comprises forming a symmetrical external surface of the outer holster having two opposing mounting surfaces each configured to receive a mounting structure for securing the outer holster to a holster mount.

8. The method of claim 7, wherein the forming of the symmetrical external surface of the outer holster comprises forming left and right opposing mounting surfaces.

9. The method of claim 8, wherein the forming of the left and right opposing mounting surfaces comprises forming mounting holes onto one of the two opposing mounting surfaces, wherein the mounting holes are configured to receive fasteners for securing the mounting structure.

10. The method of claim 9, wherein the forming of mounting holes comprises punching out the mounting holes in a secondary operation to configure the holster in either a right or left handed design.

11. The method of claim 9, further comprising aligning the mounting holes with inner holster mounting holes formed on at least one side of the inner holster, wherein the mounting holes and inner holster mounting holes are aligned to receive fasteners for securing to the mounting structure.

12. The method of claim 1, wherein the substeps of molding the first and second internal surfaces include forming first and second internal features that conform to the shapes of the first and second portions of the predetermined firearm design, including an optional peripheral component mounted on the firearm.

13. The method of claim 12, wherein the optional peripheral firearm component formed by the substeps of molding comprises a firearm-mounted light.

14. The method of claim 1, wherein the substeps of molding the first and second internal and external surfaces comprises forming surface features for retaining a firearm retention mechanism, further comprising steps of attaching at least one firearm retention mechanism component to the surface features.

15. The method of claim 14, wherein the steps of attaching at least one firearm retention component comprises attaching a retaining hood to one of the inner or outer holster, for securing the firearm into the inner holster in an engagement position.

16. The method of claim 14, the steps of attaching at least one firearm retention component comprises attaching one of a right and left handed ejector port auto locking mechanism to the first and second internal surfaces of the inner holster for securing the firearm into the inner holster in an engagement position.

17. The method of claim 14, further comprising rotatably mounting an optic shroud to the surface features molded into the external surface of the outer holster, for covering and protecting a firearm-mounted optic from impact and debris.

18. The method of claim 17, wherein the forming of surface features on the first and second internal surfaces comprises forming detents for engaging the optic shroud and to lock the optic shroud into a closed position.

19. The method of claim 1, further comprising attaching a bottom cap to a bottom portion of both the inner and outer holster for further joining the inner and outer holsters together and for protecting the edges of a material covering placed along the exterior surface of the outer holster.

20. The method of claim 1, wherein the substeps of molding the first and second internal surfaces further comprise respective substeps of molding internal extensions for contacting and supporting the firearm.

\* \* \* \* \*